United States Patent [19]

Doi

[11] Patent Number: 4,814,787

[45] Date of Patent: Mar. 21, 1989

[54] METHOD FOR COMPENSATING TEMPERATURE TO A THERMAL HEAD

[75] Inventor: Atsuhiro Doi, Kaisei, Japan

[73] Assignee: Fuji Photo Film Co., Ltd., Kanagawa, Japan

[21] Appl. No.: 4,136

[22] Filed: Jan. 16, 1987

[30] Foreign Application Priority Data

Jan. 17, 1986 [JP] Japan .................................... 61-6476
Jan. 24, 1986 [JP] Japan .................................. 61-13152

[51] Int. Cl.[4] ........................ G01D 15/10; H05B 3/00

[52] U.S. Cl. ................................ 346/1.1; 346/76 PH; 219/216

[58] Field of Search ........................... 346/1.1, 76 PH; 219/216

[56] References Cited

U.S. PATENT DOCUMENTS 4,391,535 7/1983 Palmer ................................ 400/120
4,536,774 8/1985 Invi et al. ....................... 346/76 PH

*Primary Examiner*—E. A. Goldberg
*Assistant Examiner*—Gerald E. Preston
*Attorney, Agent, or Firm*—Wenderoth, Lind & Ponack

[57] ABSTRACT

The relation between an input energy at a thermal head and recording density in a thermographical recording system varies inconveniently by the ambient temperature or the head temperature, and moreover, the slope of the relation varies by the temperatures. Therefore, even if the input energy at the thermal head alone is precisely and minutely controlled, it is heretofore difficult to obtain the desired recording density if the temperature fluctuates. Even if the temperature at the thermal head is detected by a temperature sensor, and compensation is made based on the detected temperature, it is still difficult to achieve recording of high quality because there inevitably arise a time lag between the detected temperature and the real temperature of a heating resistor which is recording images. This invention method enables high quality recording by estimating a real temperature at the heating resistor out of detected temperatures obtained with a temperature sensor and compensating the temperature based upon the estimated temperature.

6 Claims, 3 Drawing Sheets

METHOD FOR COMPENSATING TEMPERATURE TO A THERMAL HEAD

BACKGROUND OF THE INVENTION

This invention relates to a method for compensating temperature on a thermal head used in thermographical recording.

In a thermal printer of the type which uses an ink ribbon and a plain paper in the prior art, a heating element on a thermal head is heated to melt ink of the ink ribbon so that the melt ink is transferred onto a recording paper to record images or the like. The amount of ink transferred onto the recording paper is controlled by the temperature of the thermal head. As shown in FIG. 1, the recorded density D of the ink has a non-linear relation against an input energy J on a thermal head and its characteristic varies depending on the ambient temperature as well as the temperature T ($T_1$, $T_2$, $T_3$) of the thermal head. The slope coefficient $\gamma$ of the recorded density D against the input energy J is as shown in FIG. 2, of a substantially linear function against the ambient temperature and the head temperature T. The above fact is applicable to a thermal recording of the type which uses a heat sensitive paper without the ink ribbon.

The input energy J on the thermal head has a relation expressed by the following formula when a voltage applied is denoted as V, and the pulse width thereof as W.

$$J=(V)^2\cdot V \tag{1}$$

Therefore, the input energy J can be controlled by changing the applied voltage V or the pulse width W. However, not only the recorded density D at a given input energy J is varied by the ambient temperature and head temperature T, but also the slope coefficient $\gamma$ is varied by the temperature T. Therefore, the desirable density D could not be obtained if the temperature T fluctuates even if the input energy J is minutely controlled.

When the images are recorded by a thermographical recording device using the thermal head like the above, the quality of the recorded images fluctuates widely due to the temperatur of the thermal head. In the prior art, the temperature is compensated by detecting the temperature T on the thermal head with a temperature sensor, and by controlling the input energy WD onto the thermal head based upon the detected temperature T as shown in FIG. 3. The temperature compensation can be expressed by the following equation with a, b which are parameters.

$$WD=a-b\cdot T \tag{2}$$

The thermal head may have a structure shown in FIG. 4 wherein a heating element substrate 2 is provided on a supporting plate 1, and a heating resistor 3 is provided on the heating element substrate 2. By driving an electric circuit substrate 4 provided on the supporting plate 1 to control the energy supplied on the heating resistor 3, the heating resistor 3 is heated to generate heat enough to transfer the ink from a recording medium or to record onto a recording paper. The temperature on the thermal head having the above structure is heretofore detected by a temperature sensor 5 (e.g. a thermistor) attached on the reverse surface of the supporting plate 1 or by a temperature sensor 6 on the electric circuit substrate 4 as shown in FIG. 4.

However, since the temperature sensor 5 or 6 detects the temperature ambient to the heating element substrate 2 of the thermal head in those prior art devices, the detection lags behind the actual temperature changes on the heating element substrate 2 to thereby present a wide gap between the detected temperature and the real temperature on the heating element substrate 2. Even when compensated by the above equation (2), the quality of the recorded images sometimes deteriorates because of the influence of the temperature.

SUMMARY OF THE INVENTION

This invention was contrived to obviate aforementioned problems encountered in the prior art and aims at providing a method for effectively compensating input energy onto a thermal head in correspondence with the changes in ambient temperature and thermal head temperature.

Another object of this invention is to provide a method for temperature compensation applicable to thermographical recording which can precisely compensate temperature by assuming a real temperature on a heating resistor from the temperature detected with a temperature sensor.

According to one aspect of this invention, for achieving the objects described above, there is provided a method for compensating temperature on a thermal head in a thermographical recording device which thermally records images with a heating element applied with electricity, which comprises the steps of: preparing a reference input energy for the thermal head; measuring a thermal head temperature and an ambient temperature at a time of the thermal recording; and compensating the reference input energy based upon a function of said measured thermal and ambient temperatures.

According to another aspect of this invention, there is provided a a method for compensating temperature in a thermal recording wherein a temperature at a thermal head is detected to compensate as influence of the temperature in the thermal recording, which comprises the steps of: conducting said temperature detection for plural times; obtaining a difference between said plural detected temperatures; multiplying the difference with coefficients: adding the multiplied value to a detected temperature; and estimating a real temperature at the thermal head for compensation based upon the added value.

The nature, principle and utility of the invention will become more apparent from the following detailed description when read in conjunction with the accompanying drawings.

DESCRIPTION OF THE PREFERRED EMBODIMENTS

According to this invention, an ambient temperature $T_S$ and a head temperature $T_H$ are respectively measured at a time of a real thermal recording and then an input energy J optimal to a heat sensitive section of a thermal head is calculated as the function of the below formula.

$$J = f(T_S \cdot T_H) \quad (3)$$

The measurement of the ambient temperature $T_S$ and the head temperature $T_H$ may be conducted by a temperature sensor at a predetermined interval or whenever the amount of input energy J should change. When both of the ambient temperature $T_S$ and the head temperature $T_H$ change, the input energy J is determined in accordance with the function in the above formula (3).

The function of the input energy J may be expressed in the following linear function when the coefficients are denoted by a1, a2 and a reference input energy with $J_O$.

$$J = a1 \cdot T_S + a2 \cdot T_H + J_O \quad (4)$$

Figure 5:
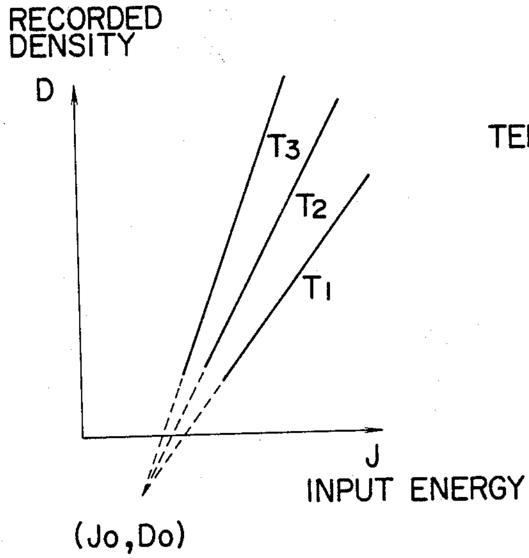
FIG. 5 is a graph to show a relation between an input energy J and recorded density D according to this invention.

If the input energy J is expressed by such a linear function, the characteristics of the recorded density D thereof may be expressed as shown in FIG. 5 or by the following formula.

$$D = \gamma(J - J_O) + D_O \quad (5)$$

The slope coefficient $\gamma$ at this time is expressed as below.

$$\gamma = \gamma_O + a \cdot T_S + b \cdot T_H \quad (6)$$

The expression $D_O$ in the above formula (5) is a reference density when the input energy J is the reference energy $J_O$ and the expression $\gamma_O$ in the formula (6) is a reference value.

When the input energy J is calculated with the above coefficient $\gamma$, the equation below holds.

$$J = \frac{1}{\gamma}(D - D_0) + J_0 = \frac{1}{\gamma_0 + a \cdot T_s + b \cdot T_H}(D - D_0) + J_0 \quad (7)$$

An optimal input energy J can be obtained by measuring the ambient temperature $T_S$ and the head temperature $T_H$ and operatively comparing them to the reference tmperature $D_O$ and the reference input energy $J_O$ in accordance with the above equation.

The input energy J may be adjusted by the temperature everytime a necessity arises by calculating according to the above formulas and by compensating the temperature based on the calculated result. It may be compensated, however, by preparing a data table for the ambient temperature $T_S$ and the heat temperature $T_H$ in advance and referring to the data table for compensation whenever necessary.

This invention method described above enables compensation of the input energy at the thermal head in correspondence to the ambient temperature as well as the head temperature and with the slope coefficient of the recorded density against the input energy taken into consideration to thereby heat the thermal head constantly with an optimal input energy.

Figure 1:
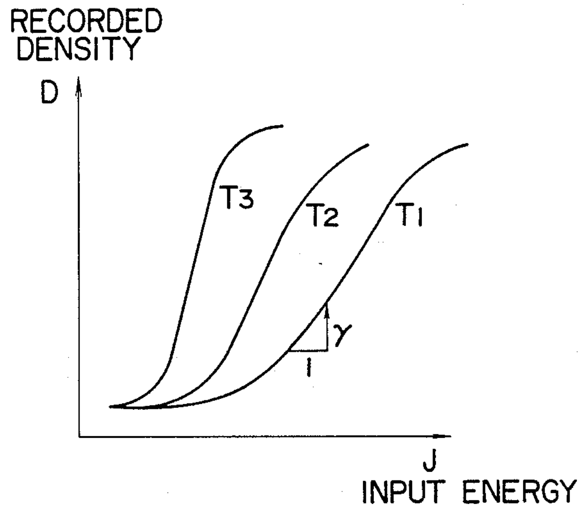
FIG. 1 is a graph to show the relation between an input energy J and recorded density D.
Figure 2:
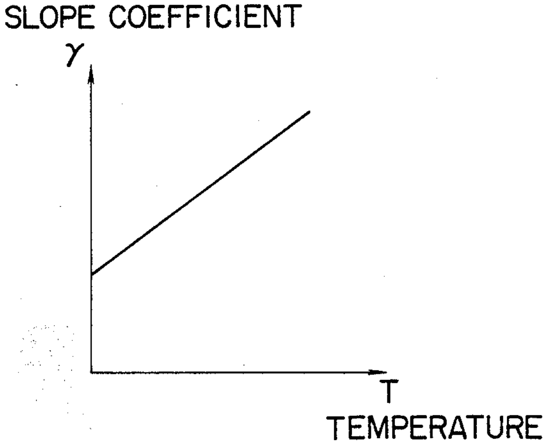
FIG. 2 is a graph to show an example of changes in a slope coefficient $\gamma$ against a temperature T.
Figure 3:
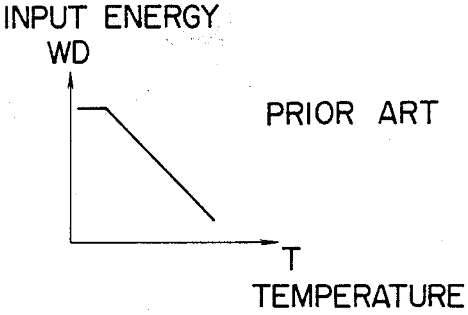
FIG. 3 is a graph to show an example of a characteristics for temperature compensation.
Figure 4:
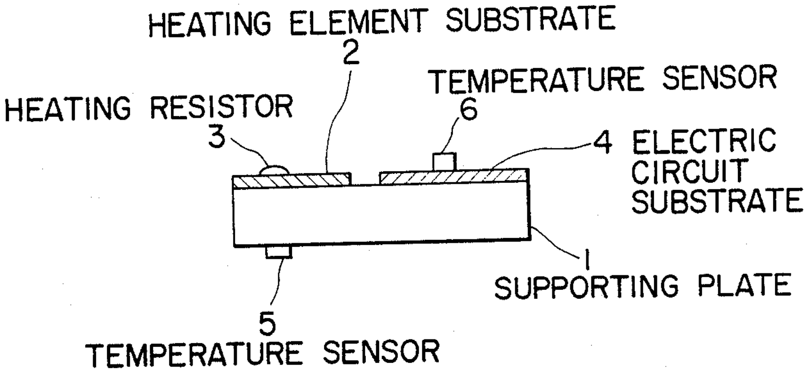
FIG. 4 is a schematic view to show an example of the structure of a thermal head.
Figure 6:
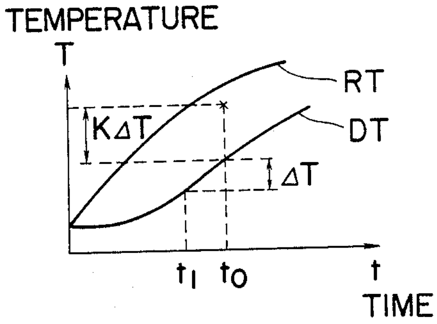
FIG. 6 is a graph to explain the principle of this invention.

The temperature sensor 5 or 6 is provided in a manner similar to the prior art on the thermal head to detect the temperature on the thermal head as shown in FIG. 4. The temperature at the thermal head is usually detected prior to the recording of a frame. Based upon the detected temperature, the input energy which is to be applied to one dot on the heating resistor 3, or if it is gradation output, the gradation characteristic is determined. When several frames are to be continuously recorded in a thermal recording system, the temperature T of a thermal head (or a heating resistor) increases and changes chronologically with the time t as indicated by a curve RT in FIG. 6. The temperature detected by the temperature sensor 5 or 6, however, follows such temperature changes with a certain time lag shown as a curve DT and tends to be lower than the real temperature RT.

In order to improve the method, according to this invention, the temperature of the thermal head is detected at least twice at time points $t_1$ and $t_0$ to calculate the difference $\Delta T$, and a coefficient K is multiplied with the difference $\Delta T$ to operatively assume the real temperature RT. In other words, actual temperature T of the thermal head is estimated from the formula below.

$$T = T(t_0) + K \cdot \{T(t_0) - T(t_1)\} \quad (8)$$

The estimated temperature T is substituted in the above compensation formula (2) for temperature compensation. By estimating the temperature T, temperature can be compensated to be a precise value or very close to the real temperature RT.

The temperature detection may be conducted with software of a CPU (e.g. a microprocessor). Temperature is detected regularly at an interval, and the detected values are converted from analog to digital, stored in a memory, read out at the next detection and compared with the next detected value to calculate the difference $\Delta T$.

Figure 7:
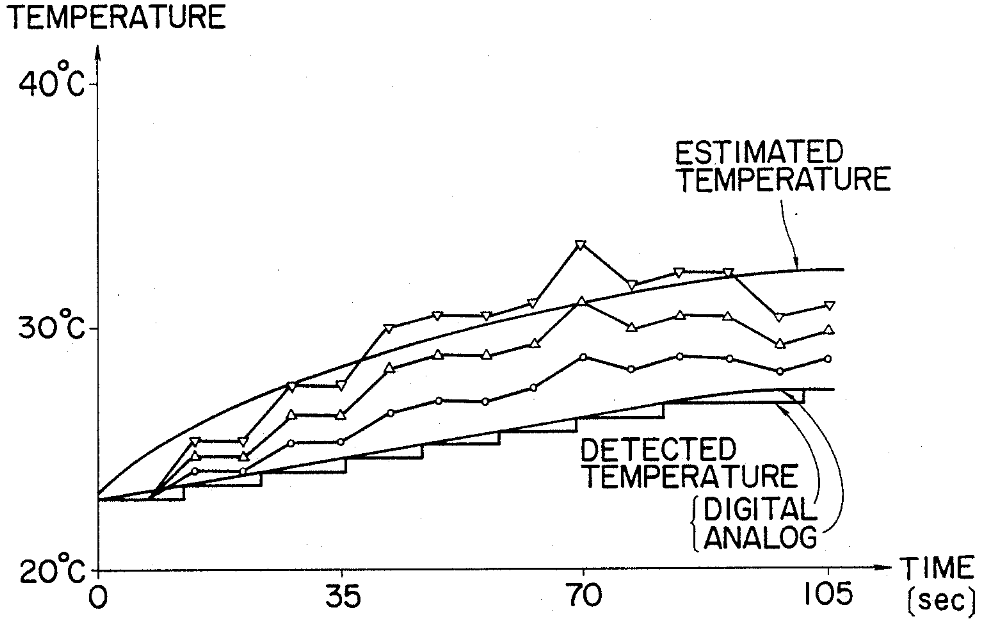
FIGS. 7 and 8 are graphs to show examples of actual data according to this invention.
Figure 8:
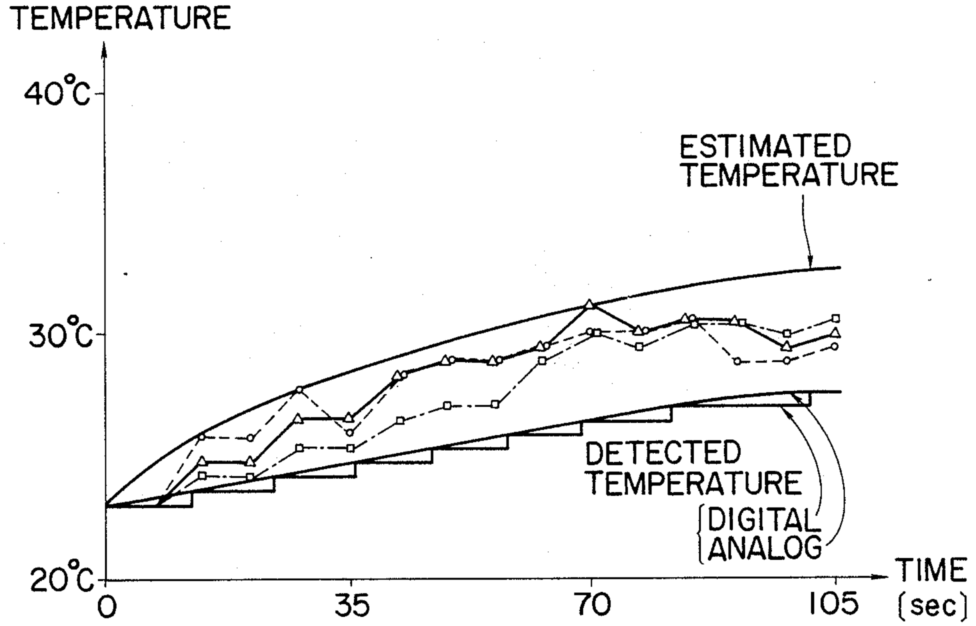

FIGS. 7 and 8 show examples of the temperatures detected by thermistors and the estimated temperature thereof with different constants K and at different measurement intervals. In FIG. 7, the curve with ∇ shows the estimated temperatures when the measurement interval is 40 sec. and the coefficient K is set at 3, the curve with Δ shows the estimated temperatures when the interval is 40 sec. and the coefficient K is set at 2, and the curve with ○ shows the estimated temperature when the interval is 40 sec. and the coefficient is set at 1. In FIG. 8, the curve with ● shows the estimated temperatures when the measurement interval is Z24 sec. and the coefficient K is set at 10/3, the curve with Δ shows the estimated temperatures when the interval is 40 sec. and the coefficient K is set at 2, and the curve with □ shows the estimated temperatures when the interval is 72 sec. and the coefficient K is set at 1.

As described in the foregoing, according to this invention method, the temperature of a heating element per se can be estimated from the temperature detected with a temperature sensor and compensated optimally to thereby stabilize the recorded density for the improved image quality.

It should be understood that many modifications and adaptations of the invention will become apparnt to those skilled in the art and it is intended to encompass such obvious modifications and changes in the scope of the claims appended hereto.

What is claimed is:

1. A method for compensating temperature in a thermal recording wherein a temperature at a thermal head is detected to compensate an influence of the temperature in the thermal recording, which comprises the steps of:

conducting said temperature detection for plural times;

obtaining a difference between said plural detected temperatures;

multiplying the difference with coefficients;

adding the multiplied value to a detected temperature; and estimating a real temperature at the thermal head for compensation based upon the added value.

2. The method for compensating temperature in a thermal recording as claimed in claim 1, further including the steps of:

preparing a reference input energy for the thermal head;

measuring a thermal head temperature and an ambient temperature at a time of the thermal recording; and compensating the reference input energy based upon a function of said measured thermal and ambient temperatures.

3. The method for compensation temperature in a thermal recording as claimed in claim 2 wherein said temperature detection is conducted at a predetermined interval.

4. The method for compensating temperature in a thermal recording as claimed in claim 3 wherein said detected temperatures are converted from analog to digital, stored in a memory, and read out at a next detection to obtain the difference.

5. A method for compensating temperature on a thermal head in a thermographical recording device which thermally records images with a heating element applied with electricity, which comprises the steps of:

preparing a reference input energy for the thermal head;

measuring a thermal head temperature and an ambient temperature at a time of the thermal recording; and compensating the reference input energy based upon a linear function of said measured thermal and ambient temperatures, wherein said compensating operation operation is carried out by the equation below:

$$J = \frac{(D - D_0)}{\gamma_0 + a \cdot T_s + b \cdot T_H} + J_0$$

wherein:

$D_O$ denotes a reference recorded density,

D a desired density, $J_O$ the reference input energy,

J input energy, $T_S$ the ambient temperature, $T_{TH}$ the head temperature, $\gamma_O$ a reference correction coefficient, and a, b coefficients.

6. A method for compensating temperature on a thermal head in a thermographical recording device which thermally records images with a heating element applied with electricity, which comprises the steps of:

preparing a reference input energy for the thermal head;

measuring a thermal head temperature and an ambient temperature at a time of the thermal recording;

preparing a data table in advance; and compensating the reference input energy based upon a linear function of said measured thermal and ambient temperatures by referring to said data table.

* * * * *